May 21, 1968 — W. J. O'SULLIVAN, JR — 3,384,324

THERMAL CONTROL WALL PANEL

Filed March 28, 1966

INVENTOR
WILLIAM J. O'SULLIVAN, JR.

BY

ATTORNEYS

United States Patent Office 3,384,324
Patented May 21, 1968

3,384,324
THERMAL CONTROL WALL PANEL
William J. O'Sullivan, Jr., 6 Everett Drive,
Newport News, Va. 23602
Filed Mar. 28, 1966, Ser. No. 538,911
6 Claims. (Cl. 244—1)

ABSTRACT OF THE DISCLOSURE

A thermosensitive wall panel completely enclosing and adapted to establish a design temperature for a structure when subjected to a variable electromagnetic radiation environment.

The invention described herein was made by an employee of the United States Government and may be manufactured and used by or for the Government for governmental purposes without the payment of any royalties thereon or therefor.

This invention relates generally to the thermal control of an enclosure, and relates with particularity to thermosensitive wall panel construction, including the provision therein for achieving controllable solar absorptivity/thermal emissivity ratio of the enclosure or panel exterior, and particularly useful in the temperature regulation of space vehicles.

It is now generally accepted that in the hard vacuum of spatial environment a spacecraft can receive and lose heat only by the process of radiative heat exchange. Thus, the temperature of a particular spacecraft of any given configuration whose exterior surfaces have fixed ratios of solar absorptivity to thermal emissivity ($a_s/e$) depends only on three things: (1) the location of the spacecraft relative to external sources of heat, that is, the Sun or any nearby planetary body like the Earth or the Moon, (2) the attitude of the spacecraft relative to the external heat sources, and (3) the rate of heat released inside the spacecraft from chemical or nuclear energy sources. There is no possible orbit or spacecraft mission of any consequence in which all three of these factors can remain constant.

The most significant parameter that can be varied to control the temperature of satellites and space vehicles is the ratio of the solar absorptivity to the thermal emissivity ($a_s/e$) of the vehicle exterior. The expression $a_s/e$ is, in a given situation, the ratio of the absorptivity of the face of, for example, a plate to solar radiation ($a_s$) to emissivity of the face of the plate to thermal radiation ($e$). Since these properties may be varied, the temperature of the object can be adjusted to the desired value by selecting a coating or providing a surface for the object's face that has the requisite value of $a_s/e$. This is one procedure used in the design of spacecraft.

For example, the temperature of a hypothetical flat plate, so oriented that its front face points directly toward the sun and, positioned in space at a distance from the sun equal to the earth's distance and, having a back side coated with an insulating material so that the plate can neither gain nor lose heat through its back side and, considered of unit area, may be used to illustrate the significance of the solar absorptivity to emissivity ratio of a body. The amount of solar radiation energy incident on the front face of this hypothetical plate in unit time is then the solar constant S whose dimensions are energy-per-unit-area-per-unit-time. A fraction of S is absorbed by the plate, the remainder being reflected. The fraction that is absorbed is called the absorptivity of the plate to solar radiation ($a_s$) and is dimensionless. Accordingly, the heat input to the plate per unit of time is $Sa_s$. The temperature of the plate will increase until it reaches a temperature such that the rate at which it radiates heat away as thermal radiation is equal to the rate that it is acquiring heat from solar radiation. The rate at which the plate radiates heat from its front face is given by the familiar formula $e\sigma T^4$ where $e$ is the emissivity of the plate to thermal radiation and is a dimensionless quantity whose numerical value can lie between 0 and 1, $\sigma$ is the Stefan-Boltzman constant, and T is the absolute temperature of the plate. Equating the rate at which the plate loses energy by radiation to its rate of acquisition of energy by absorption of sunlight gives:

$$e\sigma T^4 = Sa_s$$

This equation is solved for the temperature T of the plate to give $$T = \left(\frac{S}{\sigma}\frac{a_s}{e}\right)^{1/4}$$

At a fixed distance from the sun, as stated above, the quantity $S/\sigma$ is a constant since it is composed of two constants and therefore cannot be altered as a means of controlling the temperature of the plate. The other quantity $a_s/e$ is the ratio of the absorptivity of the face of the plate to solar radiation ($a_s$) to the emissivity of the face of the plate to thermal radiation ($e$). Since these quantities are dependent only on the optical properties of the plate face, the temperature of the plate can be controlled to the desired value by providing a coating or surface for the plate face that will maintain or achieve the requisite value of $a_s/e$ under a given condition. This is the principle used in the design of the thermal control wall panels for use as spacecraft surfaces according to the present invention and in applicant's copending application filed concurrently herewith for Thermal Control Panels, NASA Case No. 7728.

Previous methods of controlling the surface temperature of space vehicles have included surface oxidating coatings, vapor deposition of thin metallic film coatings, and coating portions or all of the surface area of the spacecraft with paint to attain the desired effective thermal radiation characteristics. In addition, a recent novel thermal control coating employed on passive communications satellites, and designed to achieve a constant $a_s/e$ ratio surface, is disclosed in U.S. Patent No. 3,176,933 to Dewey L. Clemmons, Jr., and assigned to the National Aeronautics and Space Administration. Although each of these prior art temperature control methods were adequate for the purposes intended, the limitations thereof and the meticulous processes involved in applying these surface coatings somewhat limit their capabilities for use on present and contemplated spacecraft, particularly upon long exposure to electromagnetic radiations.

In addition to applying surface coatings to the spacecraft for temperature control, other attempts at maintaining the temperature of spacecraft within permissible limits have included spinning of the spacecraft to expose all sides equally to the incident radiation, which is incompatible with most space missions; mechanical shutters used to change the $a_e/e$ ratio of the exterior surfaces, which shutters are normally heavy and tend to degrade reliability; and retarding the flow of heat into and out of spacecraft by the use of thermal insulation. Other attempts to obtain adequate temperature control have included employing heating and cooling systems within the spacecraft which are heavy and consume precious onboard power. There is thus a definite need in the art for a practical and reliable control surface for space vehicles that will change its $a_e/e$ ratio spontaneously, or on command as needed, to facilitate spacecraft temperature control.

Accordingly, it is an object of the present invention to provide a thermal sensitive wall panel construction for the control of the $a_e/e$ value of an entire spacecraft or any portions thereof within desired limits.

A further object of the present invention is the provision of a thermo-sensitive wall panel adapted to undergo a reversible change in transparency when subjected to a predetermined temperature environment.

An additional object of the present invention is the provision of a laminate wall panel having predetermined temperature responsive physical property characteristics for attainment of a specific wall design temperature.

Another object of the present invention is a novel method of achieving radiative thermal balance for an enclosure.

Yet another object of the present invention is a novel wall panel sandwich construction for use in regulating radiative heat transfer to control the temperature of an enclosure.

The foregoing and other objects are attainable in one aspect of the present invention by providing a laminate panel construction including an inner reflecting surface layer and an outer transparent layer, with an intermediate layer, formed of a solid temperature-sensitive material, sandwiched therebetween. The solid temperature-sensitive material possesses the inherent physical property characteristic of undergoing a reversible change in transparency when subjected to a predetermined temperature so that it initially absorbs the incident electromagnetic radiation until the attainment of its design temperature whereupon, due to changing its transparency characteristics, the electromagnetic radiation is permitted to penetrate the thermo-sensitive material and be reflected from the reflecting surface.

By this arrangement, it is readily seen that a wall panel may be constructed that absorbs, in whole or in part, incident electromagnetic radiation until the wall temperature attains the desired design temperature at which its changeable transparency layer becomes more transparent causing the panel to become more reflective of the incident electromagnetic radiation to, thus, automatically stabilize the panel and enclosure temperature. Similarly, in omitting the reflecting surface layer the thermo-sensitive layer will absorb in whole, or in part, the radiation from inside the enclosure until the panel temperature attains the desired temperature, at which time the changeable transparency layer becomes more transparent, causing or permitting inside radiation to escape through the wall panel to thereby permit stabilization of the enclosure temperature at the desired temperature.

This novel wall panel, whether of the reflecting or transmitting type, is useful in regulating radiative heat transfer for control of the temperature of enclosures such as found in spacecraft when exposed to the vacuum of space under which condition heat transfer can occur only by the process of radiation.

A more complete appreciation of the invention and many of the attendant advantages thereof will be readily apparent as the same becomes better understood by reference to the following more detailed description when considered in connection with the accompanying drawings, wherein:

FIG. 3c is a sectional view of slight modification of the panel shown in FIG. 3a.

Figure 1:
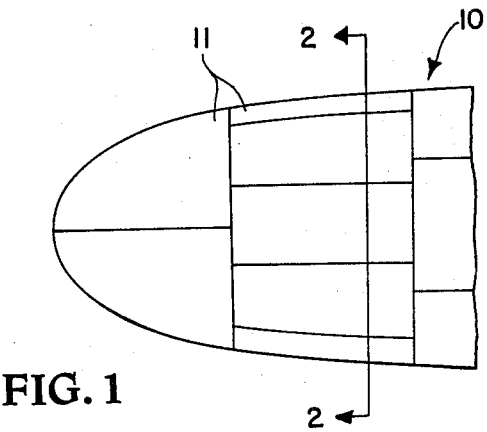
FIG. 1 is a partial view of an exemplary space vehicle employing thermal control composite wall panel construction according to the present invention.

Referring now more particularly to the drawings wherein like reference numerals designate identical or corresponding parts throughout the several views, and more particularly to FIG. 1, there is shown a space vehicle generally designated by reference numeral 10 and provided with an exterior surface area of thermo-sensitive wall panels, constructed in accordance with the present invention, as designated by the reference numeral 11. Vehicle 10 is propelled on its space mission by a suitable rocket booster system, not shown, which may then be ejected therefrom in a conventional manner as required for the particular space mission to be accomplished.

Figure 2:
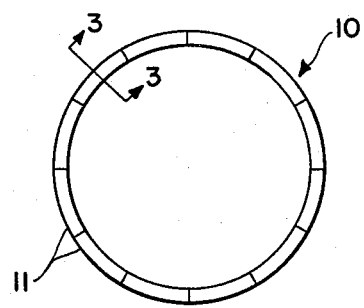
FIG. 2 is a section on line 2—2 of FIG. 1.

As shown more clearly in FIG. 2, the exposed surface of vehicle 10 consists of a plurality of laminate sections 11 disposed completely about the exterior vehicle surface. It is also readily apparent that the entire exterior surface of vehicle 10 may be in the form of a single laminate thermal control panel where so desired.

Thermal reversible transparency panels

Figure 3A:
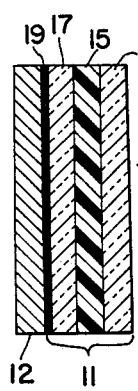
FIG. 3a is a section taken along line 3—3 of FIG. 2 illustrating one embodiment of the present invention when in condition to absorb incident radiation.
Figure 3B:
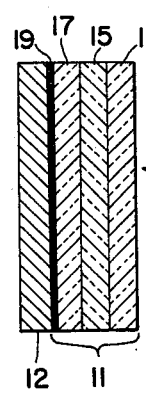
FIG. 3b is a view of the panel shown in FIG. 3a when in condition to reflect incident radiation.

Referring now more particularly to FIGS. 3a and 3b, the details of specific individual panels 11 will be more apparent and, the function of the reversible transparency layer therein promoting a controllable $a_s/e$ ratio design for a specific space mission will be better understood. As shown in these sectional views, composite panel 11 includes an outer transparent front layer 13 composed of glass, fused quartz, a plastics, or similar material that is transparent to all or most of the range of wavelengths of electromagnetic radiation, or light, to which the composite wall is to be subjected. Immediately behind layer 13 is a second laminate designated by reference numeral 15 and adapted to undergo reversible transparency, dependent upon the temperature of the material, as will be further explained hereinafter. The rear or inner layer 17 of composite panel 11 is also composed of a transparent material similar or identical to that of layer 13. On the back surface of the inner transparent laminate 17, a coating of aluminum or silver 19 is provided to act as a mirror surface that will adequately reflect the range of wavelengths of light to which panel 11 is to be subjected. This entire composite panel construction is adhesively, or otherwise conventionally, attached in thermal contact with the exterior skin or wall 12 of vehicle 10 or other suitable enclosure.

The changeable transparency material 17 has the inherent physical property characteristics that, below a certain temperature, or the design temperature thereof, it possesses a lower transparency to electromagnetic radiation than it does at higher temperatures. There are numerous materials which spontaneously undergo such a reversible transparency change at individual specific temperatures. Among the most commonly known such reversible transparency changes are those accompanying phase changes, such for example, the melting of paraffin, or the like. One large common class of materials exhibiting reversible transparency change in the phase change of melting is the alkanes, or paraffin series of normal saturated hydrocarbons, selected ones of which are enumerated in the following table that possesses melting points within the probable temperature range suitable for application in the present invention.

TABLE

| Name | Formula | Melting Point, °C. |
| --- | --- | --- |
| n-Undecane | $C_{11}H_{24}$ | −25.6 |
| n-Dodecane | $C_{12}H_{26}$ | −9.6 |
| n-Tridecane | $C_{13}H_{28}$ | −6. |
| n-Tetradecane | $C_{14}H_{30}$ | 5.5 |
| n-Pentadecane | $C_{15}H_{32}$ | 10 |
| n-Hexadecane | $C_{16}H_{34}$ | 18.1 |
| n-Heptadecane | $C_{17}H_{36}$ | 22.0 |
| n-Octadecane | $C_{18}H_{38}$ | 28.0 |
| n-Nonadecane | $C_{19}H_{40}$ | 32. |
| n-Eicosane | $C_{20}H_{42}$ | 36.4 |
| n-Heniecosane | $C_{21}H_{44}$ | 40.4 |
| n-Docosane | $C_{22}H_{46}$ | 44.4 |
| n-Tricosane | $C_{23}H_{48}$ | 47.4 |
| n-Tetracosane | $C_{24}H_{50}$ | 51.1 |

Each of the members of the alkanes listed in the table is a clear, transparent liquid at temperatures above its noted melting point and a wax-like solid at temperatures below this temperature. When in the solid state, these materials are essentially opaque, or partially transluscent and will block the passage, while absorbing much of the light incident thereto, rather than reflecting it. Thus, by selection from this group of the appropriate normal saturated hydrocarbon as the changeable transparency material for use as laminate 15 (FIGS. 3a and 3b), it is possible to provide a sandwich wall panel 11 that undergoes change, or transparency at almost any desired temperature within the range of −25.6° C. to 51.1° C.

When the wall panel 11 is at a temperature below the melting point of its changeable transparency material 15, FIG. 3a, the panel is in the absorbing condition. That is, light incident upon its transparent front layer 13 will essentially pass through this layer and be incident upon the changeable transparency material 15 which will absorb part, reflect part and transmit little or none of the light therethrough. The reflected light will pass out through the transparent front layer 13 and be lost. That which is absorbed will be converted into heat and will tend to raise the temperature of the changeable transparency material 15 and, by conduction, the temperature of enclosure or vehicle skin 12 and the other layers of the panel construction.

Any light that initially penetrates the changeable transparency layer 15 will pass through the transparent rear layer 17 and be reflected, by mirror surface 19, back to the changeable transparency material 15 and be absorbed thereby. When the changeable transparency material 15 absorbs enough radiation to cause the temperature of the wall panel 11 to rise to the melting point of material 15, the changeable transparency material 15 melts and becomes more transparent to the light as shown schematically in FIG. 3b. When sandwich panel 11 is in the reflecting condition, as illustrated in FIG. 3b, the light incident upon the transparent front layer 13 experiences little or no absorption in passing through the transparent front layer 13, the now transparent material 15 and the transparent rear layer 17, to thus be reflected by mirror coating 19 back through the entire wall panel into space. Because little or no absorption of the incident light occurs within wall panel 11 in the reflecting condition of FIG. 3b, the temperature therein ceases to increase. Should the wall temperature tend to decrease, the changeable transparency material 15 will again undergo change to the absorbing condition, as illustrated in FIG. 3a and thereby tend to add heat to the entire structure, as described hereinbefore. Thus, the composite wall panel 11 tends to automatically regulate its temperature to that desired, which is the melting point of the selected changeable transparency material 15.

Figure 3C:
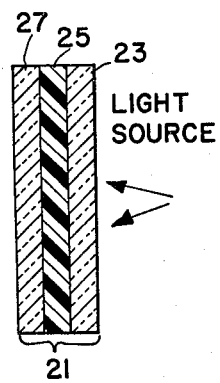

Referring now more particularly to FIG. 3c, it is also readily apparent that the reflecting surface may be omitted from the transparent laminate 27 to thereby provide a wall panel 21 which serves as a transmitting rather than a reflecting wall which serves as the skin of the spacecraft. In this form, when transmitting wall panel 21 is below its design temperature, thermal radiation from within the spacecraft will pass through layer 27 and fall upon the changeable transparency material 25 which, being in a nontransparent condition, would absorb part of the radiation and thereby experience a rise in temperature. When the wall attains the temperature at which the changeable transparency material becomes transparent, escape of the radiation would be permitted and the temperature of the panel would cease to rise. Should the temperature of transmitting panel 21 decrease, its changeable transparency material 25 would then become nontransparent, thereby absorbing the incident light, and restoring the wall to its design temperature. Thus, the transmitting wall panel 21, also automatically regulates itself to its design temperature to provide thermal control of an enclosure. It is also readily apparent that onboard selectivity could be readily provided to insert a highly reflective surface adjacent panel 21 within the spacecraft to reflect the light waves transmitted by panel 21, and thereby selectively convert the transmitting panel 21 to a reflecting panel of the type illustrated in FIG. 3b.

Figure 4A:
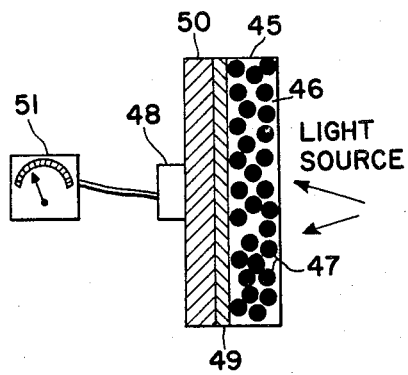
FIGS. 4a and 4b are views, partially schematic and partially sectional, illustrating the absorbing and reflecting phases of another embodiment of the present invention.
Figure 4B:
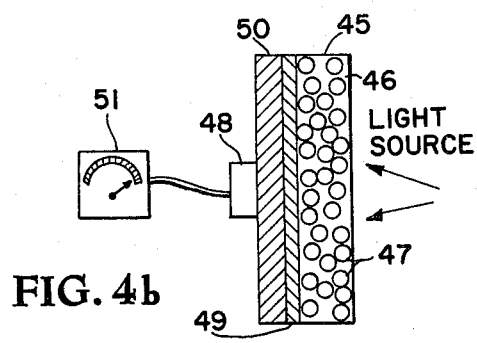

In addition to the alkanes set forth in the above table, other known materials which undergo reversible changes of transparency also have controllable design temperatures and may be employed in the present invention. For example, the layer of changeable transparency materials may consist of a transparent matrix throughout which is dispersed small particles or inclusions of a material that undergoes a change in transparency at the designed temperature. This modification is schematically illustrated in sectional views FIGS. 4a and 4b and, includes an outer thermo-reversible transparency layer 45, an intermediate reflecting surface 49 and, an opaque backing 50 which may also form or serve as the skin of the spacecraft, or other enclosures. The reversible transparency material layer 45 includes a transparent matrix 46, such for example any suitable plastics material, in which there exists a dispersed phase, shown schematically as small sphericals and designated by reference numeral 47. As illustrated in FIG. 4a, when the temperature of spacecraft surface 50 is below the design temperature of reversible transparency layer 45, the dispersed material 47 is opaque and the panel is in the absorbing condition, having a high $a_s/e$ ratio, so that it absorbs more energy from the incident sunlight than it emits, and the temperature thereof rises. When layer 45 reaches the design control temperature, the dispersed material 47 undergoes a phase change and becomes transparent (FIG. 4b), so that the incident light passes through the changeable transparency sphericals 47; is reflected by the mirror backing 49; passes again through the changeable transparency layer 45 and, out through its front face.

This permits the panel to, in effect, have a low $a_s/e$ ratio, and its temperature tends to decrease. However, as the temperature decreases, the dispersed material 47 changes back to the opaque state (FIG. 4a) and the high $a_s/e$ ratio is restored to the panel. The coating 45 thus automatically regulates itself to the control temperature, which is the design temperature at which the change of transparency occurs in the dispersed material 47. An almost infinite number of materials can be used as dispersed material 47 giving a vast range of control temperatures.

The change from absorbing to reflecting condition can occur over a very narrow range of temperature, depending upon the particular material employed for the dispersed phase, thereby permitting the panel to undergo transparency change over only a fraction of a degree range. The dispersed particles 47 can be selected from the normal saturated hydrocarbons or alkanes, as set forth in the table above, or other well known thermoresponsive reversible transparency material, dispersed in the desired proportions in a transparent solid matrix.

An experimental prototype sandwich panel employing this principle was constructed, utilizing, as the plastics matrix 45, a commercially available transparent thermoplastic having a melting point of 120° C. and sold under the trade name "Piccotex 120" by the Pennsylvania Industrial Chemical Corporation, Clairton, Pa.; and industrial quality n-eicosane ($C_{20}H_{42}$), melting point 36.4° C., as the inclusion material 47. Eighty percent, by weight, matrix and twenty percent, by weight, n-eicosane were mixed in their molten condition and the molten mixture cooled on a smooth flat surface to form a layer approximately 1/32-inch thick. When formed, this layer of material had an opaque off-white or light gray solid appearance below 36.4° C. and upon being heated above this temperature, the layer became clear and transparent while still remaining in the solid state. This layer was bonded to the aluminized side of a 0.5 mil thick Mylar plastics film, similar to that utilized in constructing the passive communications satellite disclosed in applicant's U.S. Patent No. 2,996,212, to form a complete reflecting wall panel similar to that schematically illustrated in FIG. 4a, with the aluminum surface serving as mirror 49. By attaching a conventional thermocouple 48 to the rear surface of skin 50 and, utilizing a conventional thermocouple temperature indicator 51 and a conventional photoflood lamp, not shown, as the source of light, it was experimentally shown that the thus constructed composite wall panel would initially absorb the light, causing a temperature rise. As the panel temperature reached 36.4° C., the changeable transparency material 47 became transparent (FIG. 4b) to permit the light to strike the aluminum surface and to be reflected therefrom with no appreciable temperature rise in the rear layer 50 being detectable. Upon interrupting the source of light so that the temperature of the composite panel cooled below 36.4° C., the dispersed particles of n-eicosane again became opaque and the panel reversed from a reflecting condition to an absorbing condition. As mentioned hereinbefore, by utilizing a transparent material for layer 50 and omitting mirror surface 49, this composite wall may also be readily converted from a reflecting type panel to a transmitting panel when it is desired to utilize the heat within the particular enclosures.

Although little mention has been made herein regarding onboard heat as may be generated by chemical or nuclear reactions, it is readily apparent that, by conduction, excess onboard heat may be readily transmitted to the spacecraft skin in each of the described embodiments of the invention for radiation into space or to achieve thermal balance without adversely affecting the operation of the variable transparency characteristics of the composite panels described. It is readily apparent from the description herein that a combination spacecraft temperature control system employing the variable $a_s/e$ ratio technique may be constructed utilizing any one or any combination of the various embodiments described herein on all or different areas of a particular spacecraft, as so desired.

Although the invention has been described in connection with specific exemplary embodiments thereof, it is to be understood that the embodiments are given by way of illustration only and are not to serve as limitations on applicant's invention. Accordingly, changes and modifications in the details of the invention described herein can obviously be made by those skilled in the art without departing from the spirit or scope of the invention as defined in the appended claims. It is also readily apparent that, although the invention has been specifically described in relation to temperature control of spacecraft, it is obviously applicable to any suitable inhabited or uninhabited enclosure such for example, factories, warehouses, homes, greenhouses, and the like. It is therefore to be understood that within the scope of the appended claims that the invention may be practiced otherwise than a specifically described.

What is claimed as new and desired to be secured by Letters Patent of the United States is:

1. A thermosensitive exterior surface for a spacecraft comprising:
   a plurality of laminated wall panels in contiguous relationship and serving to completely enclose said spacecraft, each said panel including:
   (1) a reflecting surface and
   (2) at least one layer of a solid temperature sensitive material,
   said temperature senstive material having the inherent physical property characteristic of undergoing a reversible change in transparency from opaque to transparent when subjected to a predetermined increased temperature environment,
   each said laminate panel being so constructed and arranged as to absorb incident electromagnetic radiation when opaque until said temperature sensitive layer reaches its predetermined design temperature whereby said temperature sensitive layer changes its transparency characteristic and permits said electromagnetic radiation to reach said reflecting surface, and be reflected therefrom to thereby establish a design temperature equilibrium for said spacecraft.

2. A thermosensitive wall panel as in claim 1 wherein said solid temperature sensitive material is selected from the group consisting of normal saturated hydrocarbons having at least eleven carbon atoms.

3. A thermosensitive wall panel as in claim 1 wherein said solid temperature material is disposed between two layers of transparent material.

4. A structure for providing thermal balance in a spacecraft during a space mission environment of varying electromagnetic radiation comprising:
   an external wall panel completely overlying the skin of said spacecraft,
   said wall panel comprising a laminate,
   (a) at least one layer of said laminate including portions having thermal reversible transparency physical property characteristics from opaque to transparent thereby serving to initially absorb electromagnetic radiation while opaque and upon attainment of the layer design temperature becoming transparent to subsequent incident radiation and,
   (b) at least one layer having a reflecting surface serving to reflect incident electromagnetic radiation back through said reversible transparency material when said one layer is in said transparent state.

5. The structure of claim 4 wherein said layer having thermal reversible transparency physical property characteristics consists of a transparent matrix having a plurality of thermo-responsive reversible transparency inclusions dispersed therein.

6. An automatically controllable solar absorptivity/thermal emissivity ratio system for achieving thermal balance in an enclosure that is adapted for exposure to a variable electromagnetic radiation environment, comprising:
   a plurality of laminated wall panels secured in contiguous relationship and in thermally conductive contact with and completely covering the skin of said enclosure, each said laminated panel including,
   (1) a transparent exterior layer,
   (2) a solid thermo-reversible transparency layer of material adjacent said transparent exterior layer and,
   (3) a reflecting surface adjacent said thermo-reversible material and so constructed and arranged as to reflect electromagnetic radiation incident thereto that passes through said transparent and said thermo-reversible layers,
   said solid thermo-reversible transparency material having the inherent physical property characteristic of initially absorbing electromagnetic radiation with the absorbed radiation causing an increase in temperature thereof and a reversal from an opaque to a transparent condition upon the attainment of a predetermined design temperature whereby, upon exposure of said enclosure surface to a source of electromagnetic radiation, any of said electromagnetic radiation incident to said panels will be transmitted through said transparent exterior layer and initially impinge upon said solid thermo-reversible layer, and said thermo-reversible layer serving to initially absorb the radiation will experience an elevation in the temperature thereof and, by conduction, cause an elevation in the temperature of the respective panel and enclosure until said thermo-reversible transparency material reaches its design reversible temperature whereupon it becomes transparent and said electromagnetic radiation will be transmitted therethrough and impinge upon said reflecting surface, said reflecting surface then serving to reflect the electromagnetic radiation received back through said thermo-reversible layer and said transparent layer to thereby achieve an automatically controlled solar absorptivity/thermal emissivity ratio condition for said panels and thermal balance for said enclosure.

References Cited

UNITED STATES PATENTS 3,174,537    3/1965    Meyer _____ 165—133

ROBERT A. O'LEARY, *Primary Examiner.*

CHARLES SUKALO, *Examiner.*

UNITED STATES PATENT OFFICE
CERTIFICATE OF CORRECTION

Patent No. 3,384,324                        May 21, 1968

William J. O'Sullivan, Jr.

It is certified that error appears in the above identified patent and that said Letters Patent are hereby corrected as shown below:

In the heading to the printed specification, lines 3 and 4, "6 Everett Drive, Newport News, Va. 23602" should read -- Newport News, Va., assignor to the United States of America as represented by the Administrator of the National Aeronautics and Space Administration --.

Signed and sealed this 18th day of November 1969.

(SEAL)
Attest:

Edward M. Fletcher, Jr.                    WILLIAM E. SCHUYLER, JR.
Attesting Officer                            Commissioner of Patents